United States Patent
La Boda

[15] 3,669,858
[45] June 13, 1972

[54] ELECTROCHEMICAL MACHINING

[72] Inventor: Mitchell A. La Boda, East Detroit, Mich.

[73] Assignee: General Motors Corporation, Detroit, Mich.

[22] Filed: May 21, 1970

[21] Appl. No.: 37,494

Related U.S. Application Data

[63] Continuation of Ser. No. 664,770, Aug. 31, 1967, which is a continuation-in-part of Ser. No. 446,389, April 7, 1965.

[52] U.S. Cl..........................................................204/143 M
[51] Int. Cl...........................................................B23p 1/00
[58] Field of Search............................................204/143 M

[56] References Cited

UNITED STATES PATENTS 2,805,197   9/1957   Thibault et al.........................204/143

Primary Examiner—J. H. Mack
Assistant Examiner—Neil A. Kaplan
Attorney—R. J. Wallace, William S. Pettigrew and Lawrence B. Plant

[57] ABSTRACT

An electrochemical machining electrolyte which forms a specific electrochemical erosion inhibiting film, which film is susceptible to removal by the application of high current densities and potentials thereto. The principal ingredient of the preferred electrolyte for forming this specific film is at least one salt selected from the group consisting of sodium chlorate, potassium chlorate, sodium perchlorate and potassium perchlorate. pH modifiers such as sodium hydroxide, sodium carbonate, sodium borate and the like may be added. pHs between about 6.7 and 11 are the most effective.

4 Claims, 5 Drawing Figures

100°F AND 200g/l SODIUM CHLORATE $NaClO_3 + H_2O$ $NaCl + H_2O$

BEFORE
(RMS) = 133 μ IN.

AFTER
(RMS) = 2-5 μ IN.

ELECTROCHEMICAL MACHINING

This is a continuation of application Ser. No. 664,770, filed Aug. 31, 1967, in the name of Mitchell A. LaBoda, which was in turn a continuation-in-part of application Ser. No. 446,389, filed on Apr. 7, 1965, which applications were assigned to the assignee of the instant application and are now abandoned.

This invention relates to electrochemical machining and more particularly to an improved electrochemical machining electrolyte solution and to the process for using it.

Numerous advances have recently been made in electrochemical machining equipment. However, despite these mechanical and electrical apparatus improvements, little advance has been made in the development of electrolyte solutions for electrochemical machining. Aqueous sodium chloride solutions are still most commonly used. Aqueous solutions of other inorganic salts, such as nitrates and nitrites, have also been used. However, these other solutions do not offer especially significant advantages over the known and accepted aqueous sodium chloride solutions. Hence, aqueous sodium chloride electrolyte solutions are still predominantly preferred. However, all of these electrolyte solutions suffer from the disadvantage of producing uncontrolled anodic dissolution of the workpiece in unwanted areas. Hence, they produce overcutting, tapering of holes, rounded edges on flat surfaces and the like. Anodic dissolution can occur with such electrolyte solutions even in areas which are fairly well removed from the cathode. Wild cutting, that is, cutting in low current density areas that are continually bathed in the electrolyte but substantially removed from the cathode generally occurs. In addition, these electrolyte solutions frequently produce splash cutting, that is, superficial anodic dissolution in areas which are only intermittently wetted by splashes or sprays of electrolyte. Further, these electrolyte solutions do not produce high quality surface finishes, particularly at higher metal removal rates.

These inherent electrolyte solution problems are well known and so severe that many mechanical and electrical innovations have been made in the attempt to overcome them. However, the mechanical and electrical innovations made so far only solve a few of these problems. None solves them all. I have found a chemical means to solve them. I have found a new electrolyte solution which actually eliminates these problems in most cases and at least substantially reduces them in all cases. I have found an electrolyte solution which produces such controlled anodic dissolution that it can produce a significantly improved surface finish even at appreciably higher than normal metal removal rates.

I have discovered that electrochemical machining processes can be improved by utilizing certain electrolytes which form unique electrochemical erosion inhibiting films which are susceptible to local removal by the application of high potentials and correspondingly high current densities to the localized regions where cutting is desired and which mask the workpiece in the lower current density areas while at the same time permitting high metal removal rates, excellent dimensional control and near perfect current efficiencies. The films are selectively destroyed by the concentration of high current densities in the areas that are to be machined. Removal of the film in those areas permits continuous cutting thereat. These areas are cut at a surprisingly high rate when one considers that a polarizing film is first being formed and then apparently destroyed. The surrounding areas which are subjected to lower current densities and stray currents retain the film and hence are not machined. Hence, electrolytes which perform in accordance with my findings permit rapid cutting rates in the high current density areas and virtually no cutting in the lower current density areas. Excellent dimensional control results.

An especially significant electrochemical machining electrolyte solution, which I have found, which looms far superior to any other heretofore known or appreciated electrolyte and which fulfills all the heretofore recited qualifications, is an aqueous solution of at least one salt selected from the group consisting of sodium chlorate, potassium chlorate, sodium perchlorate and potassium perchlorate. In addition to providing high cutting rates, excellent dimensional control and near perfect current efficiencies heretofore referred to, the chlorate and perchlorate electrolytes produce unexpectedly superior surface finishes. The electrolytes are useful for electrochemical machining with or without a mechanical assist. The former is more frequently referred to as electrolytic grinding, while the latter is more frequently simply referred to by its generic name -- electrochemical machining.

It is therefore an object of this invention to provide an improved electrochemical machining electrolyte solution and a process for using it which produces extremely rapid but highly controlled and efficient metal dissolution to permit faster electrochemical machining with closer tolerances, and improved surfaces of the machine parts.

With respect to my preferred electrolyte (alkali metal chlorates and perchlorates) I find that, for most applications, the addition of any of the other more commonly used inorganic electrolyte salts to my electrolyte solution decreases its effectiveness and increases the tendency for the bath to produce wild cutting or splash cutting. However, my new electrolyte does have a limited tolerance for certain pH controlling additives, notably sodium hydroxide. While I prefer to use sodium hydroxide for raising the pH, for certain applications, other pH controllers may be used such as sodium carbonate, potassium hydroxide, sodium borate and sodium metaborate. For most applications, and especially for the machining of ferrous metals, compounding a bath containing any of the more commonly used electrolyte salts tends to offset the dimensional control advantage of my invention. Accordingly, save for small quantities of pH controllers, in particular applications, my preferred solutions are substantially free of electrolytes other than sodium chlorate, potassium chlorate, sodium perchlorate and potassium perchlorate. While the sodium and potassium perchlorate salts are significantly improved over sodium chloride as electrolytes, the sodium and potassium chlorate salts are even better. Hence, I generally prefer to use these latter two salts. However, all four of these salts produce materially significant reductions in over cutting, wild cutting and splash cutting as well as improvement in surface finish over any other inorganic electrolyte or salt mixture that is known.

Figure 2:
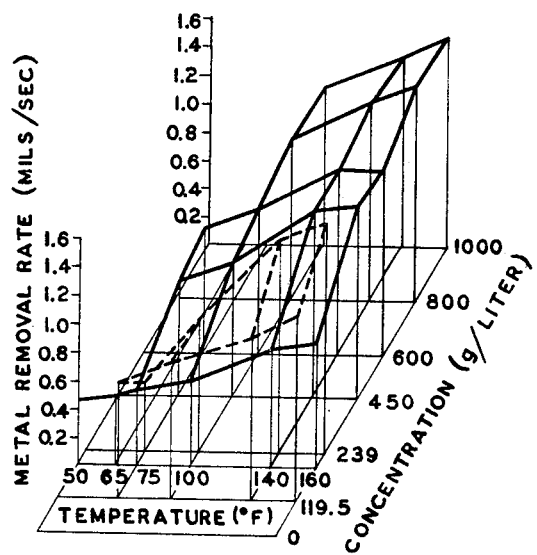
FIG. 2 is a diagram depicting a two-dimensional projection of a three-dimensional surface reflecting the relationship between the metal removal rate, electrolyte temperature, and electrolyte concentration.

Even small but effective amounts of my selected salts can be used to obtain the advantages of this invention. However, when more highly concentrated electrolytes are used, higher current densities can be employed in the process. With higher current densities, higher metal removal rates can be obtained. Consequently, I prefer to use more concentrated solutions and generally feel that it is impractical to employ solutions having concentrations less than about 100 grams per liter (g/l). Lower concentrations (e.g., 40 g/l) can e used but at the sacrifice of solution conductivity. For production applications and ease of control, I believe that a salt concentration of approximately 350 g/l would be generally preferred. Tests have shown, for example, that the metal removal rate increases quite sharply as the concentration of sodium chlorate is increased up to about 600 g/l. As the concentration is increased even further, however, the cutting rate still increases, but at a lesser rate. Hence, in the absence of a particular need for the maximum cutting rate, the economies dictate the use of a bath having no more than about 600 g/l of sodium chlorate with about 350 g/l being preferred. However, as indicated, any salt concentration will be effective in producing the intended results of this invention - even up to saturation. FIG. 2 shows the effects of sodium chlorate concentration on the cutting rate. As indicated in FIG. 2, salt concentrations (Z - axis) of approximately 1,000 g/l of sodium chlorate have been found to be highly effective, though not necessary, for most applications. In some cases, e.g., higher bath temperature operations, concentrations of approximately 1,500 g/l may be useful. However, it appears that concentrations of sodium perchlorate in excess of approximately 700 g/l do not increase benefits to the same extent as the chlorate salt. Thus, it is generally not preferred to use a sodium perchlorate concentration over about 700 g/l. The potassium salts, particularly potassium chlorate, provide the control benefits of the invention but are less soluble and may unduly limit the cutting rate. Hence, the sodium salts are generally preferred.

Incidentally, as is known in the art, some ferrous alloys (e.g., steel) have to be activated in mineral acids, acetic acid, or the like before they can be electrochemically treated. This invention does not eliminate activation. However, it can simplify activation, if one desires. Activation of ferrous metals can be achieved in a plurality of ways. For example, the parts can be immersed in concentrated hydrochloric acid for approximately 1 minute immediately prior to electrochemical machining. The part is then rinsed and machined. On the other hand, if a small amount of activating acid is added directly to my electrolyte solution, one can activate the steel right in the machining electrolyte. It appears that my electrolyte solution can tolerate up to about 3 percent by volume of concentrated activating acid before its basic, new and different properties are drastically affected. This amount of acid is generally much more than enough to produce electrolytic activation. Generally about 0.5-1.0 percent by volume concentrated acid is sufficient. However, even this small amount of activating acid actually does tend to reduce the benefits realizable with my electrolyte solution. Hence, I generally prefer not to include any activating acids at all in the electrolyte solution and to employ the usual separate treatment for activation especially in those instances where pH control is desired. In this way the integrity of my electrolyte solution is preserved and the full benefits of the invention can be realized.

Figure 3:
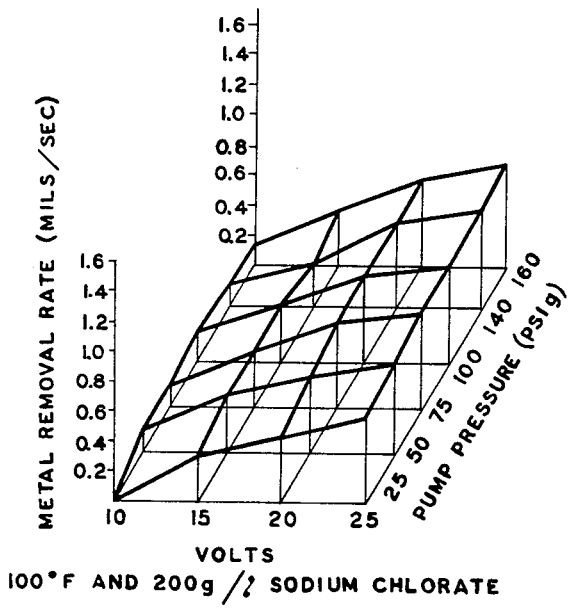
FIG. 3 is a diagram depicting a two-dimensional projection of a three-dimensional surface reflecting the relationship between the metal removal rate, the voltage and the electrolyte pump pressure.
Figure 4:
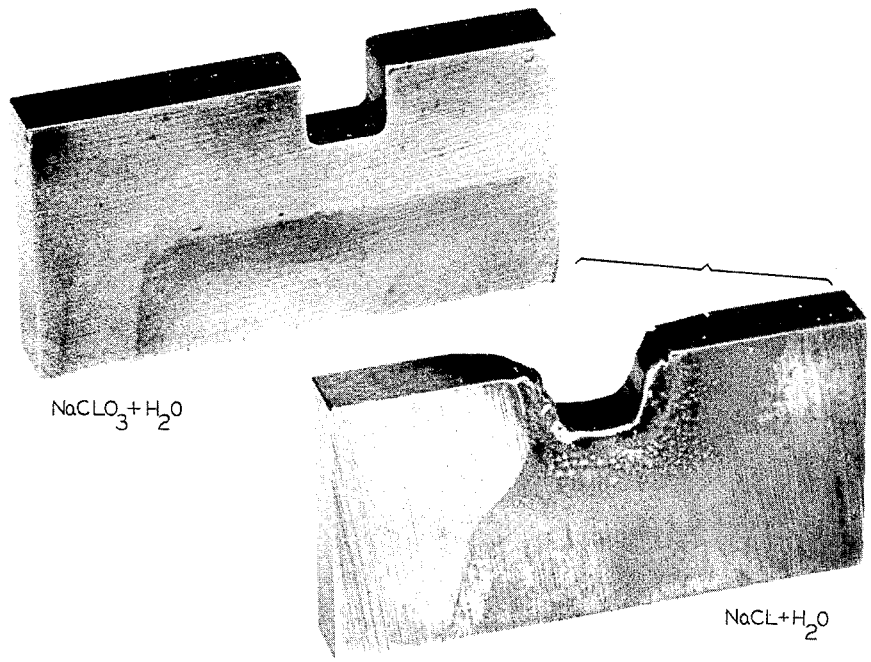
FIG. 4 depicts the dimensional control capabilities of $NaClO_3$ in electrolytic grinding applications.

The following serves as a specific example of my invention. A ferrous metal work piece of 0.7 percent carbon, 0.35 percent manganese, 0.25 percent silicon, 1.0 percent chromium, 1.75 percent nickel and the balance iron, having a surface area to be machined of about 1.3 square inches, is cleaned in the usual manner before electrochemically machining. If its surface has been allowed to become oxidized sufficiently to passivate it, it is preferably initially activated by immersion in concentrated hydrochloric acid for about 1 minute immediately before it is machined. After activation, it is then rinsed and connected as the anode in a suitable electrochemical machining apparatus, and spaced about 0.010 inch from an appropriately shaped copper cathode. An aqueous, room temperature electrolyte solution consisting of about 500 g/l of sodium chlorate in water is then applied, to flood the interface between the anode and cathode. A sufficient positive potential is then applied to the work piece to induce an anodic current density of about 250 amperes per square inch on it. This current density is continued until sufficient stock removal is obtained. The interface between the anode and cathode is continuously flushed with electrolyte during the mixing means to provide best results. In such circumstances, about 0.001-0.002 inches per second is easily removed from the surface area machined, and surface finishes as low as 2 microinches are obtained, with no wild cutting, splash cutting or the like. I have found that it is generally necessary to use an anodic current density of at least about 200 amperes per square inch in order to get sufficiently rapid metal removal rates. The maximum permissible anodic current density useful in the process is determined by the point at which arcing and/or sparking occurs. This point depends on a plurality of factors, including electrode gap spacing, salt concentration in the electrolyte, etc., as is well understood in the art. Anodic current densities of about 250-500 amperes per square inch are presently generally preferred for commercial application because they not only provide sufficiently fast metal removal but also produce an extremely good surface finish. However, much higher current densities can be used. In fact, I have found that significantly higher current densities can be used with my preferred electrolyte than with sodium chloride solutions. Hence, I can obtain significantly higher metal removal rates with my electrolyte than with sodium chloride solutions and the like. In this connection see FIG. 2 wherein some comparative data re sodium chloride is shown by broken lines superimposed onto the sodium chlorate curves. In another series of tests, FIG. 3 illustrates the relative effects of current densities (shown as applied voltage) and flow rates (shown as pump pressure) on the metal removal rate. In FIG. 3, the X-axis is plotted in terms of the potential applied to the system (volts) rather than as current densities. This was done because the rapid area changes of the anode during machining made current density readings an impractical way of demonstrating the effects of this variable. The Z-axis is plotted in terms of pump pressure rather than in terms of electrolyte velocity. This was done because the electrode spacing increased during machining and hence the velocity actually varied continuously from beginning to end of the test run. In FIG. 3, it is seen that for any given current density (expressed as impressed potential) the increase of electrolyte flow rate (expressed as pump pressure) has little further influence on metal removal rates after a certain minimum value necessary to sustain electrochemical machining is attained. Clearly electrolyte flow is not as crucial using my electrolyte as it has been with other electrolytes. However, some increase in cutting rate is noted at the higher pressures.

Increasing the current density increases the metal removal rate. In another series of experiments conducted on SAE 5160-H steel hardened to Rockwell 60C, wherein the electrolyte flow rate was held constant, it was determined that some additional mechanical action was necessary for machining below about 15 amps/cm$^2$ (100 amps/in$^2$). In this same series of experiments the current density was gradually increased. For current densities in excess of about 27-31 amps/cm$^2$ (175-200 amps/in$^2$), no additional mechanical action was required to completely remove the film. In the intermediate current density range, 15-27 amps/cm$^2$ (100-175 amps/in$^2$) there was substantial, though nonetheless incomplete, destruction of the film by the electrochemical action. It was apparent therefore that when the current density was increased to a high enough value, the film which prevented electrochemical machining was destroyed and machining proceeded. At the lower current densities, however, some additional mechanical action was necessary. In this particular series of tests the inhibiting film was identified. Vacuum fusion and electron probe analysis indicated a high percentage of oxygen on the surface of the work piece. Reflection electron diffraction studies identified a surface film of either alpha or gamma $Fe_2O_3$. Sodium chloride did not produce such a film. Other compounds appear to be able to produce chemically similar films but the properties of these other films are not comparable to that formed by the chlorates in that the dimensional control was not as good, poorer surfaces were produced, cutting rates were low and anode current efficiency was only about 70 percent. The reasons for these differences are not yet clearly known.

Still another series of experiments verified the previous findings. These latter experiments were conducted using an electrolytic grinding apparatus. Using this apparatus it was noted that, with sodium chlorate, cutting took place at lower current densities than was possible without the mechanical action normally incident to electrolytic grinding techniques. Hence, without this mechanical action, higher potentials and current densities would be necessary to provide the same amount of electrochemical cutting. This observation substantiates the previous findings that there appears to be a minimum current density below which cutting will not occur without a mechanical assist and that above this minimum no mechanical assist is required. Some tests have shown this minimum to be at about 100 amps/in$^2$.

The electrolyte solution can be used at any temperature up to its boiling point. The solubility of the sodium chlorate, potassium chlorate, sodium perchlorate and potassium perchlorate is very significantly increased with temperature. I have found that increases in temperature from 50°–140° F. showed marked increases in the metal removal rate. However, above 140° F. the metal removal rate increased only slightly. The temperature variable shown on the X-axis of FIG. 2 reflects this relationship. Hence, for faster cutting it is frequently desirable to heat the electrolyte solution above room temperature, preferably to about 140°–160° F. There doesn't appear to be any significant benefits to be obtained by operating above about 160° F. On the other hand, higher temperature operation requires special equipment to establish and maintain a predetermined electrolyte solution temperature. Thus, for some purposes, such as commercial production operations, it is often desirable to use my electrolyte solution at room temperatures and forego the benefits of higher temperature operation.

It is interesting to note the effects of only slight variations in the pH of my unique electrolyte on different materials. A stock solution of my electrolyte (e.g. 35 percent by weight solution of sodium chlorate in water) may be used to machine a variety of work pieces. Such a solution has a normal pH of approximately 6.7. However, I have found that by varying the pH, ever so slightly, I can actually "tailor" the electrolyte for a given work piece and thereby attain better and in some cases far superior results than is possible with the stock solution. For example, using sodium hydroxide as the pH controller, I have found that such steel as SAE 5160-H, 8620, and pearlitic malleable cast iron machine best at pHs between about 7–8. Other steels such as SAE J525 are best machined at pHs of about 10.4. The stainless steels generally require higher pHs such as about 8–12 for 410 stainless steel and 10–13 for 304 stainless steel. Generally speaking, pHs of about 8.5 appear to be about the optimum for most work. Approximately 10 to 20 percent increased metal removal rates were experienced on occasion when stock solutions were so adjusted. In certain instances, increasing the pH up to 11 showed improved results over the stock solution. Increasing the pH beyond about 11, however, generally decreased metal removal rates for most steels, except the stainless steels. Though, as indicated, the borates are effective as pH controllers, they have a significant disadvantage. The borates tend to crystalize out of solution under electrochemical machining conditions. As a result, pumps, hoses, and gap spaces can become clogged which contributes to the breakdown of equipment. Each of the other pH modifiers has its own peculiar disadvantage (e.g., degree of ionization) when compared to the benefits obtainable from the use of sodium hydroxide. Hence, while many pH modifiers may be employed, sodium hydroxide is still preferred.

Figure 1:
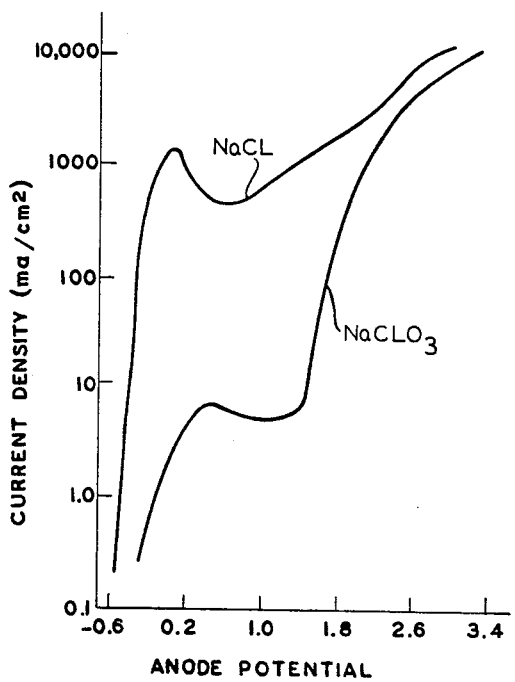
FIG. 1 is a semi-logarithmic plot of the potentiostatic curve reflecting the comparison between sodium chloride and sodium chlorate.

While I do not intend to be bound by any particular theory concerning my invention, it appears that the chlorates and perchlorates form unique destructible electrochemical erosion inhibiting films over the surface to be machined. The exact nature of, and the reason why, these unique films work and others do not is not clearly understood. Some other salts do form films. These other films do inhibit electrochemical erosion and in some instances are even destructible under high current density conditions. Even so, none of these other salts have produced films which permit the high metal removal rates. superb dimensional control, excellent surface finishes and near perfect current efficiencies experienced with the use of the chlorates and perchlorates. Potentiostatic measurements, such as shown in FIG. 1, give a clue as to the polarization characteristics that an electrolyte must have if it is to perform satisfactorily as an electrochemical erosion inhibiting film-forming electrolyte constituent. However, polarization information alone, such as reflected by FIG. 1, does not tell the whole story, nor is it enough to determine which compounds will be suitable for this improved variety of electrochemical machining. any event, when using film forming electrolytes, the film must be removed from the region to be machined before machining can commence or continue. In electrolytic grinding techniques this film is removed mechanically as by the use of abrading cathodes. Where true electrochemical machining is desired, the film is broken electrochemically by raising the potential and current density to a sufficiently high value. Below this value no machining will take place without the aid of a mechanical assist. Hence, controlled cutting can be effected by selectively destroying the film in those regions where cutting is desired and this is accomplished by selectively applying high potentials and current densities to the areas to be machined. The surrounding areas which are subjected to lower potentials, current densities and stray currents retain the film and hence are not machined. When operating at current densities below the critical electrochemical value required to destroy the film, mechanical means must be employed to break the film before machining can commence. In some cases the only mechanical assist required is that which results from the shearing forces of increased electrolyte flow rates. Generally, lower current density operations require somewhat higher electrolyte flow rates than do the higher current density operations to effect the same cutting rates. Therefore, when using my improved electrolyte either the flow rate or the current densities or both can be varied to effect a particular machining result. Increasing either will increase the amount of cutting with the potential and current density being the more significant variables. In certain cases pH is also a significant variable. In the remote areas where the current density is below the cutting current density and the mechanical action is insufficient to remove the film, no metal dissolution takes place and "wild cutting" is eliminated.

I have found that chromium, molybdenum, copper, zinc, stainless steel and a variety of other ferrous alloys, particularly through-hardened steels and tool steels, can be effectively machined with my basic electrolyte or modified version thereof. It appears that this electrolyte is useful in electrochemical machining of many, though not all, other metals also. In its basic form, for example, it is not particularly effective for machining aluminum, as there is no substantial reduction of the "wild cutting" as compared to other electrolytes. Although some surface improvement is effected on aluminum, even that isn't as good as produced on other metals. On the other hand, it is especially useful from a commercial standpoint to electrochemically machine all ferrous alloys (i.e., those alloys containing more than 50 percent iron), particularly ferrous alloys which are otherwise difficult to machine electrochemically, such as pearlitic malleable cast iron and carbide steels. My electrolyte solution exhibits improved machining results on these metals, whether they are being eroded by the electrolytic grinding technique or by simple anodic dissolution without any mechanical assist.

Figure 5:
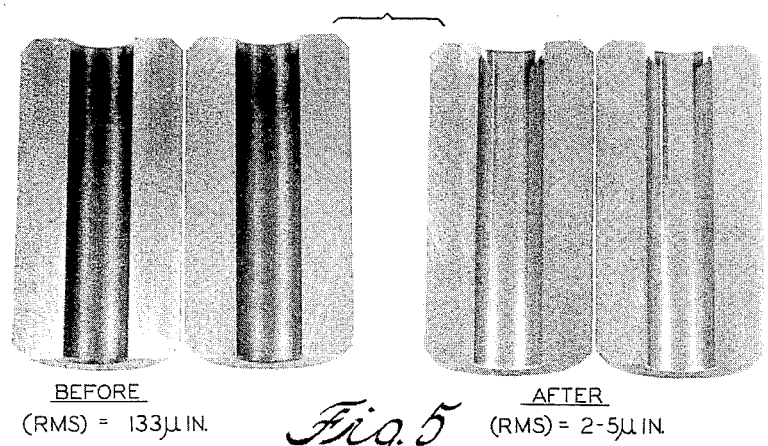
FIG. 5 depicts the surface finish obtained after electrochemically machining a screw machined, heat treated sample with $NaClO_3$.

The most unexpected and highly desirable benefit that I have found with my electrolyte solution is that it produces surface finishes in nearly every case that are substantially improved over those produced with sodium chloride electrolyte solutions, even at the high metal removal rates. FIG. 5 clearly shows the superior surfaces which are obtainable using my electrolyte. For example, on occasion, surface finishes as low as about 20 microinches may be obtained on steel machined with sodium chloride electrolytes. However, much rougher surfaces are normally obtained. I can machine the same steel over twice as fast with my electrolyte solution and still consistently obtain surface finishes of 2–5 microinches.

I claim:

1. A method for the precise electrochemical machining of a selected area of a ferrous metal workpiece comprising the steps of: making said workpiece an anode in an aqueous electrolyte solution consisting essentially of at least about 100 grams per liter of at least one salt selected from the group consisting of sodium chlorate, potassium chlorate, sodium perchlorate and potassium perchlorate; positioning a cathode adjacent said selected area in said electrolyte solution; forming an electrochemical erosion-inhibiting film on the surface of said workpiece; and selectively electrochemically removing a portion of said film to expose said area and anodically consuming said workpiece at said area by establishing a sufficient potential between said workpiece and said cathode to effect an anodic current density of at least about 100 amperes per square inch on said area during said machining.

2. The method of claim 1 wherein said electrolyte solution contains at least about 350 grams per liter of sodium chlorate and the applied potential is sufficient to establish a current density of at least about 175 amperes per square inch.

3. A method for the precise electrochemical machining of a ferrous metal selected from the group consisting of iron, iron-carbon alloys, alloy steels, stainless steels, and high-temperature alloys comprising the steps of: making said metal an anode in an aqueous electrolyte solution consisting essentially of at least about 350 grams per liter of sodium chlorate and having a pH of about 7–10.4 for said iron-carbon alloys and alloy steels and a pH of about 8–13 for said stainless steels and high-temperature alloys; positioning a cathode adjacent to said metal in said electrolyte solution; forming electrochemical erosion-inhibiting film on the surface of said metal; and selectively electrochemically removing a portion of said film to expose a selected area of said metal and anodically consuming said metal at said area by establishing a sufficient potential between said metal and said cathode to effect an anodic current density of at least about 175 amperes per square inch on said area during said machining.

4. The method according to claim 3 wherein the temperature of said electrolyte is between about 100° F. and 160° F.

* * * * *